(12) United States Patent
Zerwekh (10) Patent No.: US 11,060,932 B2
(45) Date of Patent: Jul. 13, 2021

(54) METHOD AND SYSTEM FOR SENSING HIGH RESOLUTION SHAFT POSITION AND AXIAL DISPLACEMENT

(71) Applicant: Prime Photonics, LC, Blacksburg, VA (US)

(72) Inventor: Paul Samuel Zerwekh, Shawsville, VA (US)

(73) Assignee: Prime Photonics, LC, Blacksburg, VA (US)

( * ) Notice: Subject to any disclaimer, the term of this patent is extended or adjusted under 35 U.S.C. 154(b) by 101 days.

(21) Appl. No.: 16/262,566

(22) Filed: Jan. 30, 2019

(65) Prior Publication Data

US 2019/0162611 A1 May 30, 2019

Related U.S. Application Data

(63) Continuation-in-part of application No. 16/047,385, filed on Jul. 27, 2018, now abandoned.

(Continued)

(51) Int. Cl.
*G01L 3/12* (2006.01)
*G01B 11/10* (2006.01)
(Continued)

(52) U.S. Cl.
CPC .............. *G01L 3/12* (2013.01); *G01B 11/105* (2013.01); *G01B 11/254* (2013.01);
(Continued)

(58) Field of Classification Search
CPC ......... G01L 3/12; G01L 3/109; G01B 11/105; G01B 11/254; G01D 5/34784; G01H 1/10; G01H 9/00; G01P 3/36; G01S 17/50
(Continued)

(56) References Cited

U.S. PATENT DOCUMENTS 3,307,164 A 2/1967 Friedrich
3,548,649 A 12/1970 Parkinson
(Continued)

FOREIGN PATENT DOCUMENTS

CN 1961203 A 5/2007
CN 101608944 A 12/2009
(Continued)

OTHER PUBLICATIONS

NASA Technical Memorandum 82914 (Langley Research Center, Hapton, VA, Aug. 1982).
(Continued)

*Primary Examiner* — Max H Noori
(74) *Attorney, Agent, or Firm* — Michele L. Mayberry; New River Valley IP Law, P.C.

(57) ABSTRACT

Methods and systems for the absolute high-resolution measurement of angle of rotation of a shaft, which allow for concurrent measuring of axial displacement and/or encoded identification information, are disclosed. Included is a method for measuring characteristics of a rotating shaft comprising obtaining optical signals by optically probing one or more patterns having a leading edge and a series of symbols disposed at one or more circumferences of the shaft; oversampling the optical signals; measuring time of arrival for the leading edges and determining therefrom an amount of time between arrival of two or more of the leading edges; interpolating and extrapolating the amount of time between arrival of the leading edges; and determining therefrom one or more of shaft twist, angle of rotation and/or axial loading, translation, or displacement. The methods include optically probing a pattern disposed around the circumference of a shaft that comprises a series of wedge-shaped symbols.

16 Claims, 7 Drawing Sheets

Related U.S. Application Data (60) Provisional application No. 62/538,529, filed on Jul. 28, 2017.

(51) Int. Cl.
| | |
|---|---|
| *G01P 3/36* | (2006.01) |
| *G01B 11/25* | (2006.01) |
| *G01H 1/10* | (2006.01) |
| *G01L 3/10* | (2006.01) |
| *G01D 5/347* | (2006.01) |
| *G01H 9/00* | (2006.01) |
| *G01S 17/50* | (2006.01) |

(52) U.S. Cl.
CPC .......... *G01D 5/34784* (2013.01); *G01H 1/10* (2013.01); *G01H 9/00* (2013.01); *G01L 3/109* (2013.01); *G01P 3/36* (2013.01); *G01S 17/50* (2013.01)

(58) Field of Classification Search
USPC ..................................................... 73/862.326
See application file for complete search history.

(56) References Cited

U.S. PATENT DOCUMENTS

| | | | |
|---|---|---|---|
| 3,897,766 A * | 8/1975 | Pratt, Jr. .............. | F02P 5/1553 123/406.23 |
| 3,938,890 A | 2/1976 | Flavell | |
| 4,444,064 A * | 4/1984 | Wolfinger .............. | G01L 3/109 73/862.326 |
| 4,525,068 A | 6/1985 | Mannava et al. | |
| 4,551,017 A | 11/1985 | Mannava et al. | |
| 4,641,027 A | 2/1987 | Renner et al. | |
| 5,001,937 A | 3/1991 | Bechtel et al. | |
| 5,182,953 A | 2/1993 | Ellinger et al. | |
| 5,253,531 A | 10/1993 | Walker et al. | |
| 5,365,787 A * | 11/1994 | Hernandez ............. | G01H 1/003 324/207.25 |
| 5,438,882 A | 8/1995 | Karim-Panahi et al. | |
| 5,449,900 A | 9/1995 | Halliwell | |
| 5,474,813 A * | 12/1995 | Walker .................. | G01H 1/003 427/510 |
| 5,493,921 A | 2/1996 | Alasafi et al. | |
| 5,734,108 A * | 3/1998 | Walker .................... | G01H 9/00 73/650 |
| 5,900,930 A * | 5/1999 | Simon .................. | G01D 5/2497 356/138 |
| 6,135,078 A * | 10/2000 | Doi ........................ | F01L 1/344 123/90.17 |
| 6,450,044 B1 | 9/2002 | Eisenhauer et al. | |
| 6,460,422 B1 | 10/2002 | Kuroda et al. | |
| 6,587,211 B1 | 7/2003 | Gelbart | |
| 6,587,221 B1 | 7/2003 | Young | |
| 6,759,648 B2 | 7/2004 | Baxter et al. | |
| 6,795,779 B2 | 9/2004 | Delvaux et al. | |
| 6,810,754 B2 | 11/2004 | May | |
| 7,262,834 B2 | 8/2007 | Kageyama et al. | |
| 7,302,867 B2 | 12/2007 | May | |
| 7,415,363 B2 | 8/2008 | Sue | |
| 7,545,518 B2 | 6/2009 | Heyworth | |
| 7,784,364 B2 | 8/2010 | Matzoll et al. | |
| 8,042,412 B2 | 10/2011 | Xia et al. | |
| 8,256,297 B2 | 9/2012 | Sue et al. | |
| 8,910,531 B1 | 12/2014 | Sue et al. | |
| 9,244,438 B2 | 1/2016 | Hoover et al. | |
| 9,404,791 B2 | 8/2016 | Rossi et al. | |
| 9,841,278 B2 | 12/2017 | Britte et al. | |
| 9,933,323 B2 | 4/2018 | Schweizer et al. | |
| 2003/0015590 A1 | 1/2003 | Chen | |
| 2004/0255699 A1 | 12/2004 | Matzoll et al. | |
| 2006/0032319 A1 | 2/2006 | Zielinski | |
| 2009/0025488 A1 | 1/2009 | Sihler et al. | |
| 2014/0360804 A1 | 12/2014 | Oguchi et al. | |
| 2019/0033147 A1 | 1/2019 | Zerwekh et al. | |

FOREIGN PATENT DOCUMENTS

| | | |
|---|---|---|
| CN | 102494817 A | 6/2012 |
| CN | 202329888 U | 7/2012 |
| CN | 106595728 A | 4/2017 |
| FR | 2624602 A1 | 6/1989 |

OTHER PUBLICATIONS (Zerwekh, Paul Samuel) Co-pending U.S. Appl. No. 16/047,385, filed Jul. 27, 2018, Specification, Claims, Figures.

(Zerwekh, Paul Samuel) Co-pending U.S. Appl. No. 16/855,145, filed Apr. 22, 2020, Specification, Claims, Figures.

Co-pending U.S. Appl. No. 16/047,385 Non-final Office Action dated Nov. 8, 2019, 6 pages.

* cited by examiner

METHOD AND SYSTEM FOR SENSING HIGH RESOLUTION SHAFT POSITION AND AXIAL DISPLACEMENT

CROSS-REFERENCE TO RELATED APPLICATIONS

The present application claims priority to and is a Continuation-in-Part (CIP) of U.S. patent application Ser. No. 16/047,385 filed Jul. 27, 2018, which '385 application relies on the disclosure of and claims priority to and the benefit of the filing date of U.S. Provisional Application No. 62/538,529, filed Jul. 28, 2017. The disclosures of these applications are hereby incorporated by reference herein in their entireties.

BACKGROUND OF THE INVENTION

Field of the Invention

The present disclosure relates to determining one or more characteristics of a rotating body, such as shaft twist, angle of rotation and/or axial loading, translation, or displacement. The characterization of torque and torsional vibration in rotating bodies is also included. Embodiments of this disclosure provide systems and methods which enable high-fidelity, high-speed characterization of the rotary motion of a body with or without surface modification. In embodiments, the systems and methods rely on either inherent properties of the surface of the rotating body and/or one or more patterns applied to its surface to determine the degree to which a rotating body vibrates, twists, or is otherwise translated.

Description of Related Art

In addition to monitoring the performance of both motors and associated loads, accurate characterization of shaft torque and vibration provides critical information about fault conditions that can ultimately lead to catastrophic component failure. Measuring the torque applied to a shaft is conventionally managed through one of two general techniques; application of a physical sensor to the shaft, or through a non-contact optical technique.

Most existing methods for torque measurement typically function through direct contact with the shaft—most often through attachment of strain gages to the shaft. Application of torque to a shaft produces strain within the body of the shaft, acting along orthogonal, helical lines. Usually, strain gages are mounted to the shaft along the orthogonal, helical lines, and the local strain monitored.

The use of strain gages to measure torque is widespread and effective. While the techniques are sound and accurate, strain gage techniques suffer from difficulties in implementation. Physical application of the strain gage to the shaft requires surface treatment and epoxy selection. Reading the strain from a gage requires application of electrical power and detection in changes in electrical properties, necessitating complicated slipring attachments to provide signal feedthroughs.

Some non-contact optical methods involve imparting a contrast pattern to the surface of the shaft, such as by way of a laser etched blaze pattern, painted and/or labeled features, or the application of zebra tape. Furthermore, non-contact techniques are usually limited in frequency response, due to the physical resolution of the applied contact features. Most of these techniques are thus unable to capture information about higher frequency shaft vibrations that can cause ultimate failure in rotating mechanical systems.

Another technique involves measuring the Doppler shift of a laser focused onto the surface of the rotating body (see, e.g., U.S. Pat. No. 4,525,068). In laser Doppler measurements, the photons incident on the rotating surface are frequency shifted due to the motion of the body relative to the direction of propagation of the laser. This technique allows for non-contact measurement of the twist on the rotating body, but requires sophisticated optical pathways and filtering, and can suffer signal loss due to anomalous features on the rotating surface.

Some of the techniques presented here do not directly measure torque, but rather measure the torsion angle on the shaft. Indirect torque measurements through torsion angle are a standard practice, and are commonly used to enable torque measurements with strain gages. The system in embodiments described here measures the average twist along the length of the shaft between the probes.

In the range of elastic strain, the relation between torsion angle $\phi$ and torque M can be expressed as $$\varphi = \frac{M \cdot I}{G \cdot I_p}$$

where I is the length of the torsional sector G is the sheer modulus of the shaft, and Ip is the polar moment of inertia for the shaft. The geometry of the shaft—whether hollow or solid—is accounted for in the moment of inertia portion of the equation.

Examples of efforts in this area include those described in U.S. Pat. Nos. 9,244,438; 8,042,412; 7,784,364; 7,545,518; 7,302,867; 6,810,754; 6,759,648; 6,587,211; 6,460,422; 6,450,044; 5,734,108; 5,493,921; 5,474,813; 5,438,882; 5,182,953; 5,001,937; 4,641,027; 4,551,017; 4,525,068; 3,938,890; 3,307,164; U.S. Patent Application Publication Nos. 20090025488, 20040255699, 20030015590; French Patent Publication No. 2624602A1; Chinese Patent Publication Nos. 106595728A and 1961203A; and NASA Technical Memorandum 82914 (Langley Research Center, Hapton, Va., August 1982). Yet, as with any art, there remains a need for improvements.

SUMMARY OF THE INVENTION

Embodiments of the invention provide a method to detect the rotary motion of a body using a non-contact technique. Using at least one probe, at least a portion of the surface topology of the rotating body is compared to a master pattern containing a normalized measure of that topology. The topology of the body results in a fingerprint that represents the angular position of the shaft in time. Comparison of the instantaneous position of features in the fingerprint pattern with that of the master pattern provides a measure of the motion of the body. Using a single probe, the method enables determination of the angular speed of the body, as well as the frequency of angular vibration of the rotating body. The addition of at least one more probe reduces the sensitivity of the method to vibration, and enables characterization of the twist on the body. Given the shape and materials of the rotating body, it is possible to calculate the torque applied to the body, as described in the background section.

Particular exemplary aspects of the invention include:

Aspect 1. A method for detecting a change in a rotating body comprising: providing a master pattern associated with surface topology of a body; rotating the body about an axis; during the rotating, measuring by way of a non-contact measuring technique at least one second pattern associated with surface topology of the body; comparing the at least one second pattern to the master pattern to determine any difference in surface topology of the body as a result of the rotating; and determining a change in the rotating body from the difference.

Aspect 2. The method of Aspect 1 wherein only a single measurement point on the body is used to determine rotation speed.

Aspect 3. The method of Aspect 1 or 2 wherein a single measurement point on the body is used to determine amplitude of angular vibration of the body.

Aspect 4. The method of any of Aspects 1-3 wherein a single measurement point on the body is used to determine frequency of angular vibration of the body.

Aspect 5. The method of any of Aspects 1-4 wherein multiple measurement points on the body are used to determine twist of the body.

Aspect 6. The method of any of Aspects 1-5 wherein multiple measurement points on the body are used to determine twist of the body in order to calculate torque applied to the body.

Aspect 7. The method of any of Aspects 1-6 wherein multiple measurement points on the body are used to determine motion on the body that is coherent between multiple measurement points in order to mitigate effects of vibration of the body that is not angular.

Aspect 8. The method of any of Aspects 1-7 wherein multiple measurement points on the body are used to determine motion on a body that is axial in nature.

Aspect 9. A method for detecting a change in a rotating body, comprising: measuring reflected light from the rotating body to provide a master pattern; and measuring a second pattern of reflected light from the rotating body and comparing the measured second pattern to the master pattern using a correlation function, thereby determining a phase difference between the second pattern and the master pattern to provide a measure of the twist of the rotating body with time.

Aspect 10. The method of Aspect 9, wherein the reflected light from the rotating body is measured with at least one optical probe, and preferably at least two optical probes.

Aspect 11. The method of any of Aspects 1-10 comprising: indirectly measuring shaft torque; and using a non-contact measuring technique.

Aspect 12. A method for measuring shaft torque, the method comprising: providing a master pattern associated with surface topology of a body in communication with a shaft; rotating the body and the shaft about an axis; during the rotating, measuring by way of a non-contact measuring technique at least one second pattern associated with surface topology of the body; comparing the at least one second pattern to the master pattern to determine any difference in surface topology of the body as a result of the rotating; and determining shaft torque from the difference.

Aspect 13. The method of Aspect 12 wherein the non-contact measuring technique comprises measuring one or more of shaft vibrations, twisting, torsion angle, and/or other translation.

Aspect 14. The method of Aspect 12 or 13 wherein one or more of shaft vibrations, twisting, torsion angle, and/or translation, which have a frequency in the range of 1-5 kHz, in the range of 5-10 kHz, in the range of 10-15 kHz, in the range of 15-20 kHz, in the range of 20-30 kHz, in the range of 15-25 kHz, in the range of 10-40 kHz, in the range of 5-45 kHz, or in the range of 15-35 kHz, are used to determine the shaft torque.

Aspect 15. The method of any of Aspects 12-14 wherein one or more of shaft vibrations, twisting, torsion angle, and/or translation comprising high frequency vibration, twisting or translation above 5 kHz, or above 10 kHz, or above 20 kHz, or above 25 kHz, or above 30 kHz, are used to determine the shaft torque.

Aspect 16. The method of any of Aspects 12-15 wherein the shaft is rotating at a speed of 5,000 RPM or higher, or a speed of 10,000 RPM or higher, or a speed of 15,000 RPM or higher, or a speed of 18,000 RPM or higher, or a speed of 20,000 RPM or higher, or a speed of 10,000 RPM to 50,000 RPM, or a speed of 12,000 RPM to 45,000 RPM, or a speed of 8,000 RPM to 22,000 RPM, or a speed of 17,000 RPM to 28,000 RPM.

Aspect 17. The method of any of Aspects 12-16 wherein the shaft torque is indirectly measured by measuring torsion angle on the shaft.

Aspect 18. The method of any of Aspects 12-17 wherein the shaft torque is indirectly measured using probes by measuring an average twist along the length of the shaft between the probes.

Aspect 19. The method of any of Aspects 12-18 which employs a variable binning technique wherein each revolution of the shaft is not subdivided into bins of fixed width (in radians), but a set number of data points are used for comparison.

Aspect 20. The method of any of Aspects 12-19 wherein data points are correlated against an entire master shaft pattern to determine the phase change due to rotation and speed of the shaft.

Aspect 21. The method of any of Aspects 12-20 comprising updating data in a first-in/first-out technique and providing a moving pattern matching algorithm.

Aspect 22. The method of any of Aspects 12-21, which have a measurement accuracy of better than 2% full-scale and a real-time reporting rate of 5 kHz to 10 kHz to 20 kHz and higher on shafts rotating at speeds of 18,000 RPM or higher.

Aspect 23. The method of any of Aspects 12-22 comprising accounting for 1 or 2 markers per revolution, or 5 to 15 markers per revolution, or 10 to 20 markers per revolution, or 18 to 25 markers per revolution, or 22 to 30 markers per revolution, or at least 20 markers per revolution, or at least 8 markers per revolution, or at least 10 markers per revolution.

Aspect 24. The method of any of Aspects 12-23 wherein at least 10 or more, 15 or more, or 20 or more unique identifiers are considered along the circumference of the shaft.

Aspect 25. The method of any of Aspects 1-24 wherein the measured pattern results from surface topology of the rotating body.

Aspect 26. A method for detecting a change in a rotating body comprising measuring the topology of the surface of the rotating body at one or more points comparing at least a portion of the measured pattern between two points in time to determine the change in motion of the rotating body between those two points in time.

Aspect 27. A method for measuring one or more characteristics of a rotating shaft comprising: rotating a shaft about an axis of rotation; wherein the shaft comprises one or more patterns of a series of symbols disposed at one or more circumferences of the shaft; wherein one or more of the patterns comprises a leading edge; obtaining one or more optical signals by optically probing one or more of the patterns; oversampling one or more of the optical signals; measuring time of arrival for one or more of the leading edges of the patterns and determining therefrom an amount of time between arrival of two or more of the leading edges; interpolating and extrapolating the amount of time between arrival of the leading edges; and determining therefrom one or more of shaft twist, angle of rotation and/or axial loading, translation, or displacement.

Aspect 28. The method of Aspect 27, wherein the duty cycle of a symbol pair is 50% to maintain AC balance and axial displacement is determined by the duty cycle of each half symbol.

Aspect 29. The method of Aspect 27 or 28, wherein: the position of each leading edge is treated as a real non-integer number to compensate for pattern label length not matching the circumference of the shaft; and the interpolation slope is adjusted accordingly at each detected edge.

Aspect 30. The method of any of Aspects 27-29, wherein one or more pattern is repeated along one or more of the circumferences of the shaft.

Aspect 31. The method of any of Aspects 27-30, wherein axial displacement and/or encoded identification information is concurrently measured along with angle of rotation.

Aspect 32. The method of any of Aspects 27-31, wherein a first pattern is disposed at a first circumference of the shaft and a second pattern that is the same or a different pattern as the first pattern is disposed at a second circumference of the shaft.

Aspect 33. The method of any of Aspects 27-32, wherein the pattern is applied on or in the surface of the shaft.

Aspect 34. The method of any of Aspects 27-33, wherein the pattern comprises 2D and/or 3D symbols.

Aspect 35. The method of any of Aspects 27-34, wherein the pattern comprises 2D contrast symbols.

Aspect 36. The method of any of Aspects 27-35, wherein the pattern comprises multiple wedge shaped symbols.

Aspect 37. The method of any of Aspects 27-36, wherein the pattern is AC balanced.

Aspect 38. The method of any of Aspects 27-37, wherein the pattern comprises the same length of white as black in a complete revolution around the circumference of the shaft.

Aspect 39. The method of any of Aspects 27-38, wherein the symbols have a spacing defined by one edge that is spaced at uniform spacings or at even multiples of a common spacing.

Aspect 40. The method of any of Aspects 27-39, wherein repeatability of this spacing but not the spacing itself determines the resolution of the rotational position measurement.

Aspect 41. The method of any of Aspects 27-40, wherein at least one symbol comprises a wedge in order to provide axial position measurement.

Aspect 42. The method of any of Aspects 27-41, wherein one or more of the patterns comprises a combination of non-wedged and wedged symbols in order to fit more symbols around the circumference of the shaft for the same minimum feature size.

Aspect 43. The method of any of Aspects 27-42, wherein one or more of the symbols comprises binary data, analog values, or combinations thereof.

Aspect 44. The method of any of Aspects 27-43, wherein one or more analog values are encoded in the duty cycle of the symbol to encode the shaft angle in the symbol duty cycle, allowing redundant measurement of shaft position.

Aspect 45. The method of any of Aspects 27-44, wherein multiple measurement points are used to determine shaft twist, angle of rotation and/or axial loading, translation, or displacement.

Aspect 46. The method of any of Aspects 27-45, wherein at least two probes are used to obtain the optical signals.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIGS. 6 and 7 are diagrams showing an embodiment of a system which includes two patterns on a shaft, each pattern being measured with an optical probe, where FIG. 6 shows measurement of shaft twist for torque measurement and FIG. 7 depicts measurement of rotation and axial loading or translation.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In one embodiment of the invention, one or more optical probes, such as a pair of optical probes, are pointed to a rotated body, separated by a gage length. A master pattern of reflected light is generated during an initial calibration phase. During operation, a small portion of the instantaneous reflection pattern is collected and compared to the master pattern using a correlation function. The phase difference between the instantaneous and master patterns, coupled with the instantaneous speed measurement, provides a measure of the twist of the shaft with time. The frequency of twist that can be characterized is a function of the size (in time) of the section of the instantaneous pattern used to determine local motion.

In another embodiment, a single optical probe is used to generate a master and instantaneous reflection pattern. Comparison of the instantaneous pattern to the master pattern enables the system to determine the frequency (not direction) of vibratory motion on the rotating body. Often, users are interested only in the mode (i.e. frequency) of vibration of a shaft. Even without the quadrature provided by a second probe, the amplitude and frequency of the vibratory modes may be calculated.

In embodiments, two or more arrays of probes are separated by a gage length. As the rotating body moves in directions other than in a rotary fashion (e.g. thrust of a shaft), the master pattern fingerprint for one probe in an array will shift to a different probe within that array. The shift between correlation from one probe to another provides a measure of the degree of motion of the rotating body in the direction of separation of the two probes. This information can be coupled with the twist information gathered from the two probe arrays to provide rotation speed, vibration vector (amplitude, frequency, and direction), and thrust motion of the rotating body.

Figure 1:
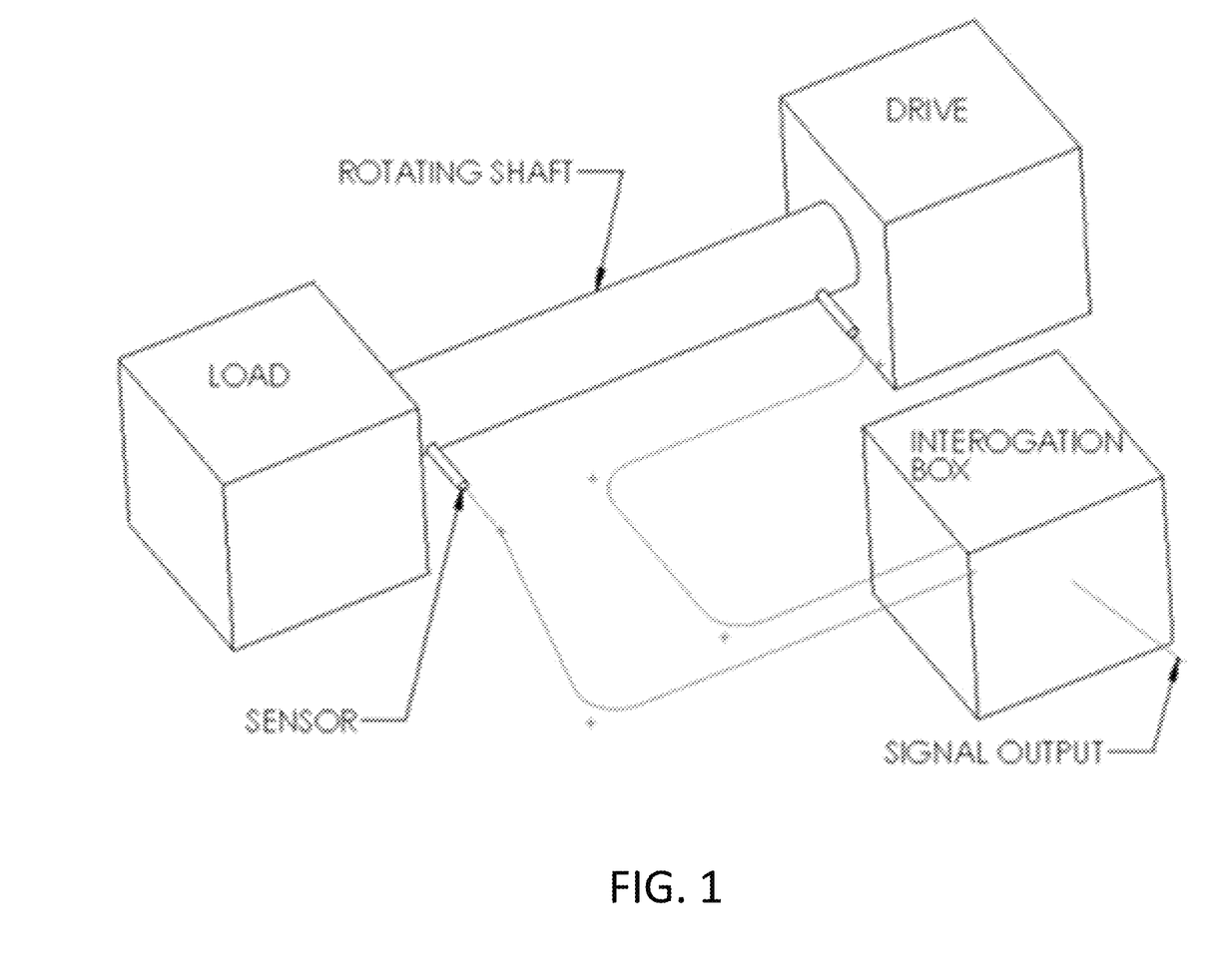
FIG. 1 is a schematic diagram of a system according to an embodiment.

FIG. 1 shows a preferred embodiment of the invention. In the figure, a shaft connects a drive to a load. A pair of sensors are located along the shaft, separated by a known distance. The outputs of the probes are connected to an instrument that compares the outputs of the probes to one another to determine the change in phase between surface patterns. The change in phase is then converted to twist, and the torque is calculated from the geometry of the configuration. The output of the torquemeter may then be fed to any data collection or logging instrumentation.

The present inventors have implemented the system shown in FIG. 1 as a pair of hardened optical probes connected to a compact data acquisition and processing electronics package by way of optical cables. The system measures shaft twist, calculates torque, and provides real-time reporting at 20 kHz data rates. The hardened optical probes include sapphire windows. As described further in the Examples, the compact, rugged instrumentation provides high speed, calibrated torque measurement.

Figure 2:
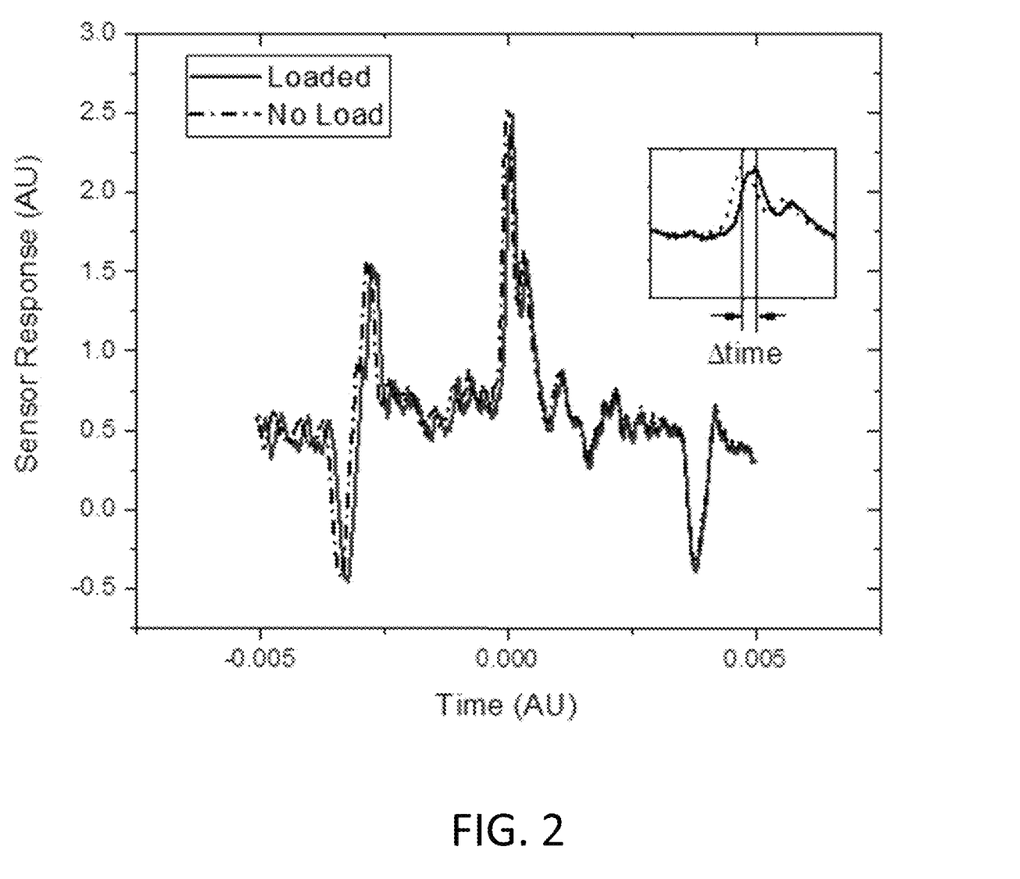
FIG. 2 is a graph which shows sample measurement waveforms.

FIG. 2 is a graph showing sample measurement waveforms. When a rotating shaft is observed between loaded and no-load conditions, there is a phase shift between the measurement patterns. Using the no-load as a master reference pattern, the twist of the shaft under load conditions may be made by comparing the change in phase shift. Note that the change is not strictly a unilateral time shift, but the two curves show different delays depending on the time observed—typical of a phase shift between two curves. The inset of the figure shows a closer view of the phase shift of the central peak.

Embodiments of systems of the invention can include a computing device or instrument that includes a processor (CPU), graphics processing unit (GPU), and non-transitory computer readable storage media such as RAM and a conventional hard drive. Other components of the computing device can include a database stored on the non-transitory computer readable storage media. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include a set of computer-executable instructions, or software for implementing the methods, processes, operations, and algorithms of the invention. The computer-readable instructions can be programmed in any suitable programming language, including JavaScript, C, C#, C++, Java, Python, Perl, Ruby, Swift, Visual Basic, and Objective C.

The non-transitory computer-readable medium or media can comprise one or more computer files comprising a set of the computer-executable instructions for performing the methods, processes, operations, and algorithms of the methods of the invention and optionally an operating system. In exemplary embodiments, the files may be stored contiguously or non-contiguously on the computer-readable medium. Embodiments of the invention may also include a computer program product comprising the computer files, either in the form of the computer-readable medium comprising the computer files and, optionally, made available to a consumer through packaging, or alternatively made available to a consumer through electronic distribution such as downloading from the internet.

Other components of the computing device can include network ports (e.g. Ethernet) or a wireless adapter for connecting to the Internet, input/output ports (e.g. USB, PS/2, COM, LPT), a mouse, a keyboard, a microphone, headphones, a display, and the like. If under control of an operating system, the software programs for implementing the methods of the invention can be accessed via an Application Programming Interface (API), Software Development Kit (SDK) or other framework. In general, the computer-executable instructions for implementing the methods, and/or data, are embodied in or retrievable from the disk space or memory of the device, and instruct the processor to perform the steps of the methods. Input/output ports may be used to connect the computing device to the probes or a data logger.

Additional embodiments may include or be enabled in a networked computer system for carrying out one or more of the methods of this disclosure. The networked computer system may include any of the computing devices described herein connected through a network. The network may use any suitable network protocol, including IP, TCP/IP, UDP, or ICMP, and may be any suitable wired or wireless network including any local area network, wide area network, Internet network, telecommunications network, Wi-Fi enabled network, or Bluetooth enabled network.

The systems and methods of the invention can be applied to any system or apparatus with a rotating body, such as engines, crankshafts, gearboxes, transmissions, rotors, and compressors. Other uses and applications will be apparent to the skilled artisan.

EXAMPLES

Example 1

The FOCIS™ hardware was leveraged to develop a non-contact, optical torque measurement system. The system was demonstrated on as-received titanium and carbon fiber shafts, as well as painted titanium and carbon fiber shafts. The system was used to measure torque to a 0.023° accuracy, corresponding to 50 in-lbs at 8 inches on a 2-inch steel shaft. The Phase I hardware used post-processing algorithms that would provide for a reporting rate greater than 9.6 kHz upon translation to a real-time system.

A demonstration of measurement accuracy of better than 2% full-scale and real-time reporting rate of 20 kHz on various shafts rotating at speeds approaching 18,000 rpm can be expected by embodiments of the invention. In embodiments, the invention is expected to provide an impartial validation of the ability to report torque to within 2% full scale accuracy with a reporting rate that exceeds 10 kHz on a shaft rotating at 18,000 rpm.

In addition to monitoring the performance of both motors and associated loads, accurate characterization of shaft torque and vibration provides critical information about fault conditions that can ultimately lead to catastrophic component failure, and provide valuable information about system efficiencies. Existing methods for torque measurement typically function through direct contact with the shaft—most often through attachment of strain gages to the shaft. Current non-contact optical methods require imparting a contrast pattern to the surface of the shaft. Whether through a laser etched blaze pattern, painted features, or the application of zebra tape, these methods require modifications to the shaft, and do not lend themselves to retrofit applications where shaft modifications are unacceptable. There is currently no method for measuring shaft torque without parasitically loading the shaft or incurring significant penalties for installation.

The system of the invention features a pair of shock and vibration hardened, high temperature capable FOCIS™ probes (Prime Photonics, Blacksburg, Va.) with the capability to detect native surface features on shafts, wheels, or blades. High-speed, cross-correlation of the spectra of the captured waveforms yields a phase delay that corresponds to twisting of the shaft. An accuracy of 50 in-lb across an 8-inch gage length was previously demonstrated, with a projected reporting rate exceeding 9.6 kHz. The hardware can be configured to consist of a pair of custom-designed, hardened optical probes, and a high-speed laser driver/digitization instrument with a real-time reporting rate of 20 kHz, and an accuracy better than 2% full-scale. Not only can the high-speed system be configured to provide non-contact, highly accurate torque measurements, it can also be configured to measure shaft speed, and high frequency vibrational modes.

According to embodiments, one or more of the optical probes used in the system sends a light signal to the target (shaft) surface and then captures reflected light. The probe(s) can be optical probes with a lens on the end of the probe, or can be a probe where the optical fiber simply ends at the tip of the probe. The lensed configuration allows the probe to be operated a further distance from the shaft. The probes can be configured in a number of ways. For example, the probes can have both input and output channels lensed, providing focused or collimated light on the output channel and collimated or focused acceptance from the input channel. Alternatively, the probes can be unlensed where light from the probe immediately diverges at the exit of the probe output channel with the same for the receive input channel in the probe. Further, a combination of the above is possible, where either the output is lensed and input is unlensed, or the input is lensed and the output is unlensed.

A prototype optical torque measurement system (OTS) has been designed and fabricated and its capability to accurately measure torque twist across varying surface finishes, torque levels, and shaft speeds has been demonstrated. The system can measure twist with a resolution of better than 0.08°, with a data reporting rate of up to 9.6 kHz. The ability to measure twists of up to 6° has been demonstrated, though there is physically no upper bound on the measurement. The system can measure twist on virtually any material including titanium shafts, carbon fiber shafts, painted shafts (either titanium or steel). The twist on shafts with large total indicated runout (TIR) of up to 0.05" has been demonstrated, which indicates insensitivity to large shaft runouts.

The system can be configured with the ability to measure torque to within 100 in-lb. The nature of the FOCIS™ OTS system measurement technique is such that there is no limit to the torque that can be measured. By correlating the phase shift between any two points on the shaft, the system can measure shaft twists that exceed 360°. The minimum torque measurement is a function of the resolution of the optical sensors (both spatially and temporally), the sensor-to-sensor spacing, and the modulus of the shaft. It is expected that the system can provide adequate resolution to measure torsion angles small enough to attain better than 2% accuracy on a 5000 in-lb full scale load.

The system can also be configured with the ability to report torque at 5 kHz for an 18,000 RPM rotation rate. The second highest technical risk lies in the required reporting rate. To provide a 5 kHz reporting rate, a torsional torque measurement system requires roughly 20 markers per revolution, assuming an 18,000 RPM rotation rate. For this system to operate as a truly non-invasive measurement technique, the ability to identify over 20 unique identifiers along the circumference of the shaft, and perform local cross-correlated phase determination with very high resolution is preferred. It is further preferred that the FOCIS™ OTS system can operate within parameters where the 5 kHz requirement can be exceeded.

The systems can also be configured with algorithms to enable Field-Programmable Gate Array (FPGA) processing for real-time reporting. The raw output of the system can be configured to comprise a set of voltages corresponding to the local reflectivity of the shaft. Translating these waveforms into usable torque data typically requires several processing steps—including Fourier transforms, filtering, and cross-correlation. The implementation of these algorithms in post-processing is time consuming, and typically requires trained personnel. It is expected that the invention can provide data processing algorithms necessary to supply users with accurate, reliable, and timely information via implementation of data processing into the Prime Photonics FPGA-based FOCIS™ Data Capture Unit. Included are an Assembled Torque Demonstration Rig for titanium and composite shafts, an executed test matrix for variable shaft materials, surface finishes, torques and rotation rates, a twist measurement algorithm, a binning algorithm to support wide range of speed operation, measurement update at 9.6 kHz reporting rate, twist angle resolution better than ±0.09°, system operation with various shaft surface finishes, including bare titanium, carbon fiber, and painted titanium, demonstration of the system on multiple shaft diameters and on shafts with varying rigidity and moment of inertia, and embodiments for Navy, DoD and industrial applications.

Figure 3:
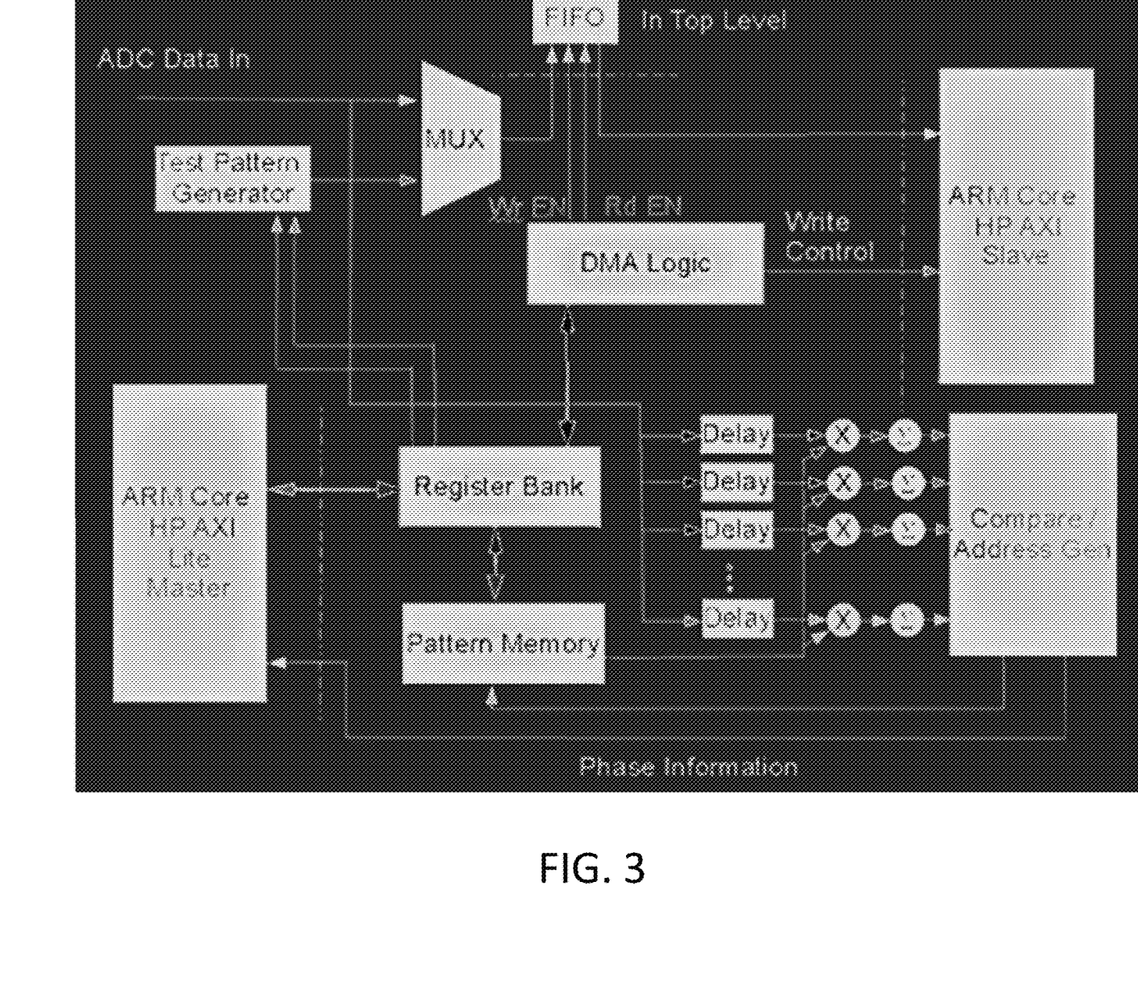
FIG. 3 is a schematic diagram which shows an algorithm for Field Programmable Gate Array (FPGA)-based processing according to an embodiment.

According to embodiments, one or more algorithms for FPGA-based processing are configured as follows. First, the data from the probe is filtered to remove coupled noise, then routed to several parallel delay lines. Each of these delayed versions of the sample data is then multiplied by a master pattern read from memory, and the resulting products are integrated over a programmable time to calculate points on a correlation curve. The magnitude of these correlation sums is then compared, and the address of the pattern memory is varied in such a fashion as to center the correlation peak. This process is performed continuously, and the resulting address represents the rotating body angle as a function of time. The algorithm (specific to implementation in an FPGA) is shown schematically in FIG. 3. However, as appreciated by a skilled artisan, the one or more algorithms can be implemented in software, alternatively or in addition to hardware implementation.

In previous efforts, post-processing algorithms were developed to divide the reflection pattern for each revolution of the shaft into a fixed number of bins. While this calculation method has the potential to provide data reporting rates in excess of 20 kHz, new algorithms have been formulated to provide a higher degree of quality in the correlated signal while maintaining the high data rate. The algorithm involves a variable binning technique wherein each revolution of the shaft is not subdivided into bins of fixed width (in radians), but a set number of data points are used for comparison. The data points are correlated against the entire master shaft pattern to determine the phase change due to rotation, as well as the current speed of the shaft. The data are continually updated in a first-in/first-out technique, providing a moving pattern matching algorithm throughout the shaft rotation. As such, the software can be configured to comprise algorithms to correlate partial fingerprint patterns with the calibrated master pattern, and to automatically update the master pattern to accommodate for changes in the reflected pattern from the shaft surface.

The master pattern against which measurements are compared can also be updated. During regular operation of the torque monitor system, the expectation is that the shaft will undergo changes—whether through scratches to the surface, or through deposition of surface contaminants (dust, oil, grease). To account for small changes in the reflectivity of the shaft, the software must update the master pattern to include evolution to the shaft. One difficulty and risk expected in this master update algorithm is to ensure that higher order harmonic vibrations are not filtered out through an incorporation into the master pattern.

Algorithms can also be drafted and translated to the software on the instrument being used. Verification of the algorithms should not only involve validation of the language of the code, but also of the operation of the algorithms themselves. Validation of the algorithms is somewhat agnostic of shaft rotation conditions (in terms of speed and applied torque), and can therefore be validated using the test rigs. The algorithms can also be further stress tested by exploring the effects of shaft rotational parameters on reporting rate and torque accuracy.

Additional tests can be used to focus on normalization of the system against mean strain and higher frequency strain. High frequency transients during shaft spin-up and ramp-down periods have been identified as characterization targets. Current torque measurement systems have difficulty tracking higher order harmonics during rapid acceleration, and one objective is to capitalize on the high reporting rate available from the system to capture these dynamics.

The FOCIS™ Optical Torque Sensor (FOCIS™ OTS) optically measures small changes in shaft torsion without contacting the shaft and without any modifications to the shaft material or finish, providing a robust solution for non-contact torque measurements on rotating shafts that is particularly well-suited for retrofit applications. The high frequency response of FOCIS™ OTS also makes it ideal for shaft torsional vibration measurements, an important consideration for shaft driven systems that have rapidly varying load characteristics. The retrofittable capability of FOCIS™ OTS can enable shaft torque and torsional vibration measurements to be made on a wide range of engines and equipment for diagnostics and test and evaluation, and can create new design opportunities for future aircraft, industrial and commercial equipment designs.

Example 2

Figure 4A:
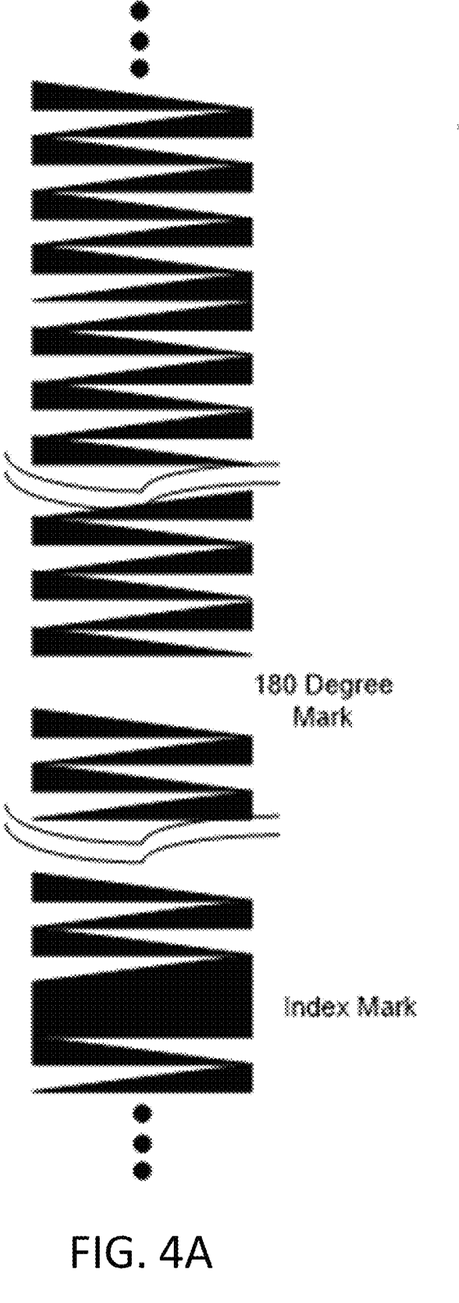
FIG. 4A is a diagram showing a pattern that can be used for high resolution shaft position, axial displacement, torque and/or torsional vibration measurement, and/or product identification according to an embodiment.
Figure 4B:
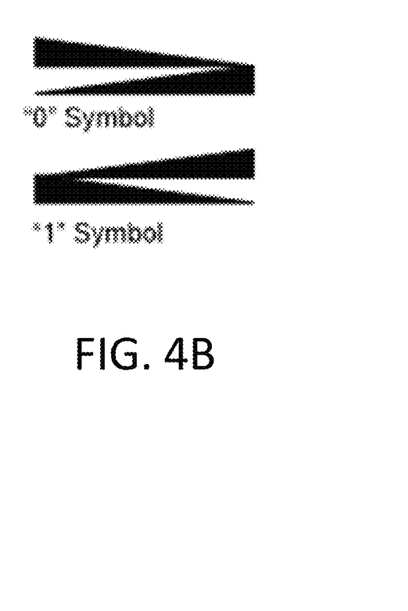
FIG. 4B is a diagram showing the encoding of binary information by particular arrangements of wedge symbols in the pattern according to an embodiment.

Embodiments of the invention provide systems and methods which advantageously allow the absolute high-resolution measurement of angle of rotation of a shaft while being capable of concurrently measuring axial displacement and encoded identification information. According to embodiments, the system and method optically probe a pattern or patterns disposed around the circumference of a shaft, which pattern(s), which can include one or more patterns comprising a series of wedge-shaped symbols such as shown in FIG. 4A. The wedged shaped symbols can be arranged in a manner so that the wedge shaped symbols encode binary data such as the "0" symbol and "1" symbol as shown in FIG. 4B. In embodiments, the pattern can be a sequence of features disposed on or in the shaft along a circumference of the shaft. Patterns can include one or more inherent surface features and/or one or more applied features, such as 2D or 3D surface features, contrast patterns, laser-etched patterns, painted features, a label, tape such as zebra tape, and/or a bar code.

On any given shaft circumference, the rectangular waveform from the optical receiver has no DC content to avoid edge jitter due to AC imbalance. High resolution is achieved by oversampling the optical signal and measuring the time of arrival for each leading edge of the pattern of wedged-shaped symbols. Axial displacement is determined by the duty cycle of each half symbol (the duty cycle of the entire symbol pair being 50% to maintain AC balance).

An algorithm used in conjunction with the pattern label looks at the rising edge of each pattern symbol. The high resolution is achieved by oversampling the optical signal and measuring the time of arrival for each leading edge of the pattern or pattern symbol. The time between the pattern edges is interpolated (then extrapolated for the next symbol period), providing a shaft angle resolution much higher than the pitch of the symbols themselves. The algorithm can also be configured to treat the position of each rising edge as a real (non-integer) number to compensate for the pattern label length not precisely matching the circumference of the shaft. The interpolation slope is adjusted accordingly at each detected edge.

This embodiment is capable of maintaining position lock when the shaft being monitored undergoes axial displacement (e.g., up to 1 inch or more of displacement), and is also useful for product identification. This concept can also be applied to magnetic pickups by using wedge shaped teeth rather than conventional gear teeth.

Key considerations for the patterns include the following. First, each pattern should be AC balanced. That is, each pattern should have the same length of white as black over a complete revolution. This is to prevent distortion of the resulting pulse widths due to finite rise and fall times when the pattern is read.

Second, the symbols should have one edge that is spaced preferably at uniform spacings, but at a minimum, even multiples of a common spacing. The repeatability (not the spacing itself) of this spacing will determine the resolution of the rotational position measurement.

Third, at least one symbol must be comprised of a wedge in order to provide axial position measurement.

Figure 5:
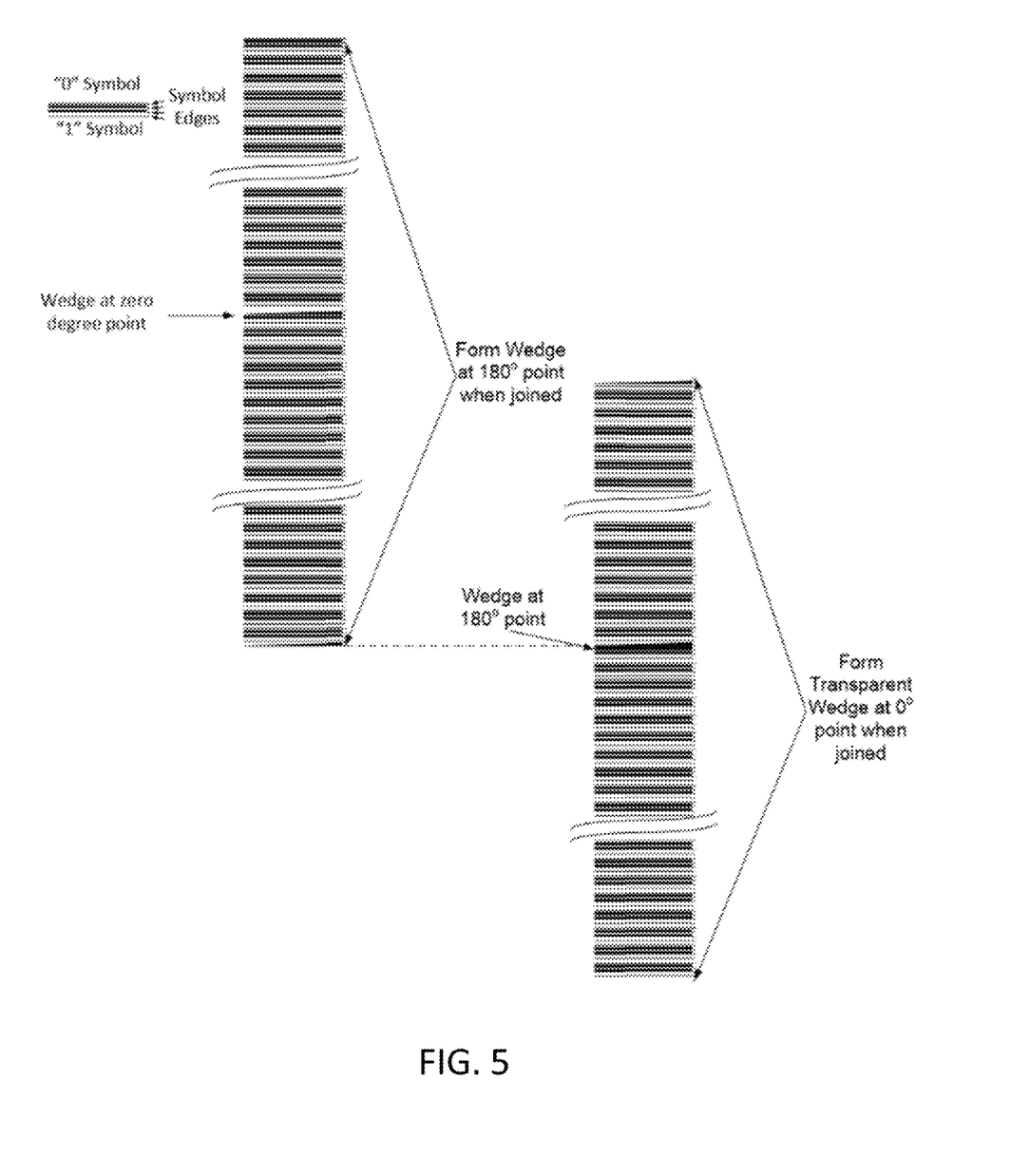
FIG. 5 is a diagram showing a pattern that can be used for high resolution shaft position, axial displacement, torque and/or torsional vibration measurement, and/or product identification according to another embodiment.

Further, it may be advantageous to use a combination of non-wedged and wedged symbols in order to fit more symbols around the circumference of the shaft for the same minimum feature size. In other embodiments, all of the symbols in the pattern can be wedged symbols. An exemplary pattern is shown in FIG. 5. The figure shows formation of a black wedge in the pattern when the ends of the pattern shown are joined at the 180 degree point, as well as a white or transparent wedge in the pattern when joined at the 0 degree point. For example, the label can be configured to form a continuous loop with a mostly black wedge on one side, and a corresponding mostly transparent wedge on the other to maintain AC balance.

The symbols need not be limited to representing only binary data. Analog values can be encoded in the duty cycle of the symbol as it may be continuously varied. One application of this would be to encode the shaft angle in the symbol duty cycle, allowing redundant measurement of shaft position.

Figure 6:
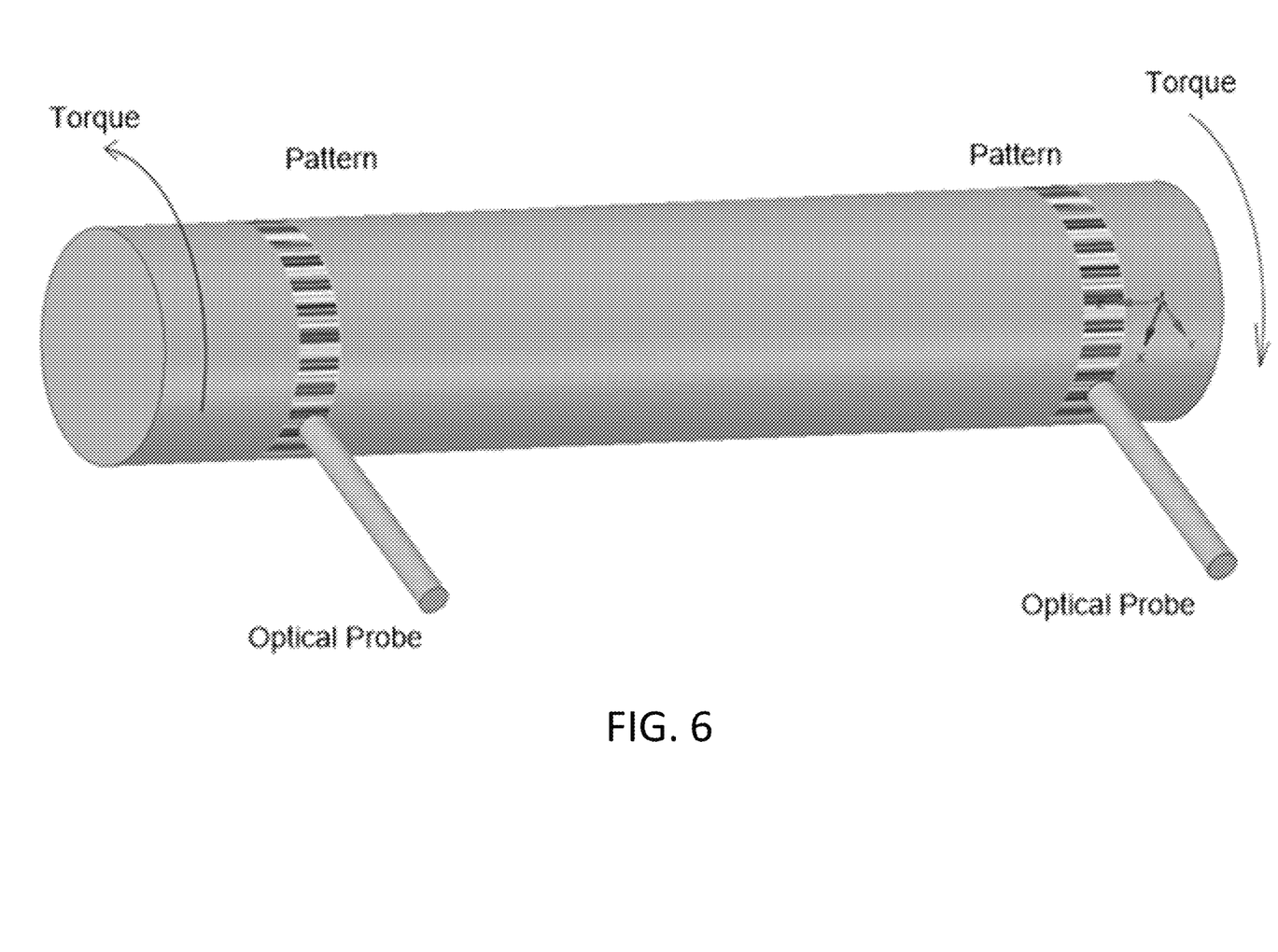
Figure 7:
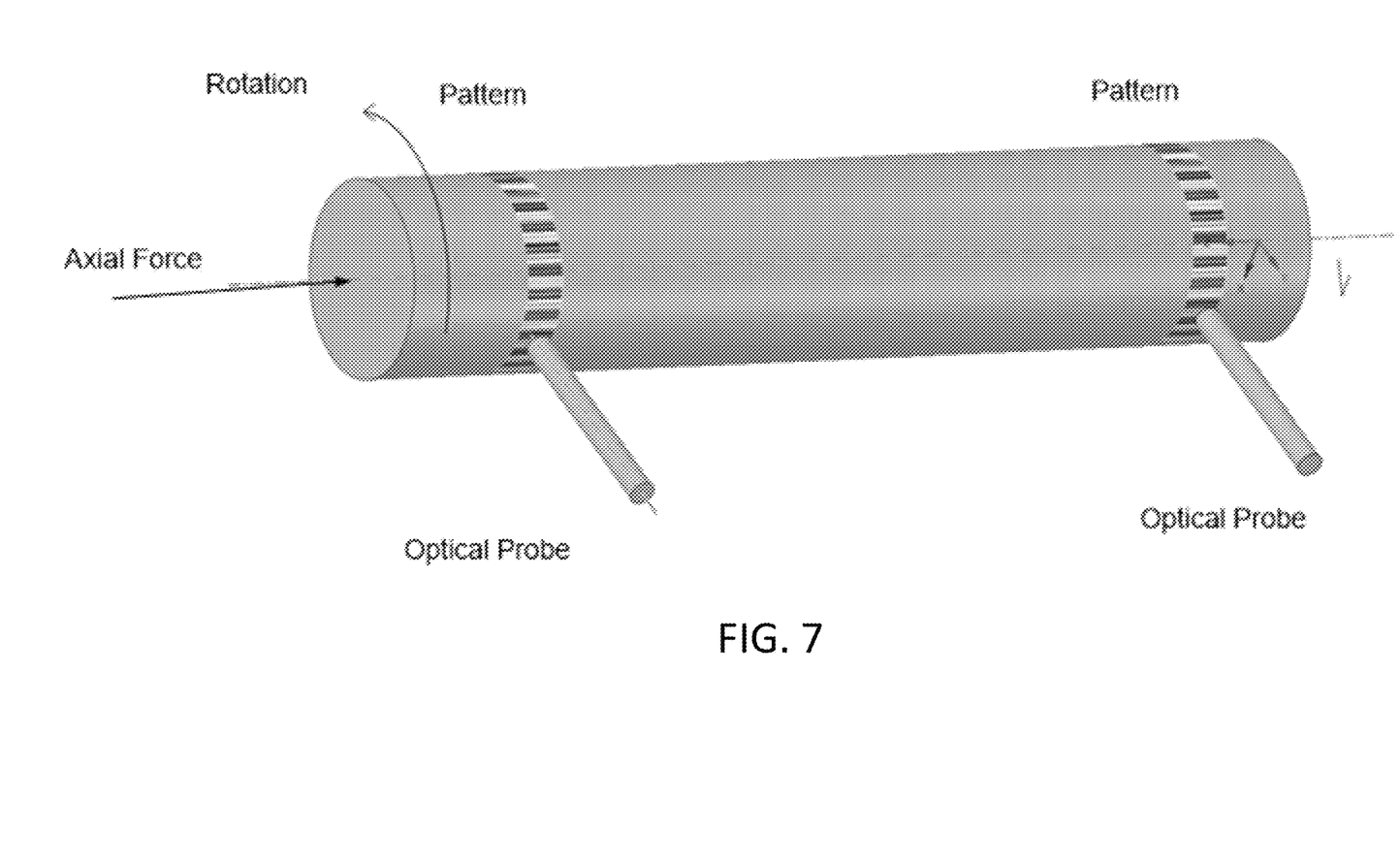

FIGS. 6 and 7 represent an embodiment of a system which includes two patterns on a shaft, each pattern being measured with an optical probe, where FIG. 6 shows measurement of shaft twist for torque measurement and FIG. 7 depicts measurement of rotation and axial loading or translation. Any number of patterns can be disposed on a shaft to measure any number of factors relating to the shaft, and the patterns on the shaft can be identical or different.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for measuring one or more characteristics of a rotating shaft comprising:
    rotating a shaft about an axis of rotation;
        wherein the shaft comprises one or more patterns of a series of symbols disposed around one or more circumferences of the shaft;
        wherein each of the patterns comprises an edge and the edges are spaced uniformly around the circumference of the shaft, each pattern having the symbols disposed therein in a manner to provide for equal amounts of less reflective and more reflective surface to maintain AC signal balance;
    obtaining one or more optical signals by optically probing one or more of the patterns with a single fiber probe;
    oversampling one or more of the optical signals;
    measuring time of arrival for one or more of the edges of the patterns and determining therefrom an amount of time between arrival of two or more of the edges;
    interpolating and extrapolating the amount of time between arrival of the edges;
    determining therefrom one or more of shaft twist, angle of rotation and/or axial loading, translation, or displacement.

2. The method of claim 1, wherein multiple measurement points are used to determine shaft twist, angle of rotation and/or axial loading, translation, or displacement.

3. The method of claim 1, wherein:
    the position of one or more of the edges is treated as a real non-integer number to compensate for pattern label length not matching the circumference of the shaft; and
    the interpolation slope is adjusted accordingly at each detected edge.

4. The method of claim 1, wherein one or more pattern is repeated along one or more of the circumferences of the shaft.

5. The method of claim 1, wherein axial displacement and/or encoded identification information is concurrently measured along with angle of rotation.

6. The method of claim 1, wherein a first pattern is disposed at a first circumference of the shaft and a second pattern that is the same or a different pattern as the first pattern is disposed at a second circumference of the shaft.

7. The method of claim 1, wherein the pattern is applied on or in a surface of the shaft.

8. The method of claim 1, wherein the pattern comprises 2D and/or 3D symbols.

9. The method of claim 1, wherein the pattern comprises 2D contrast symbols.

10. The method of claim 1, wherein the pattern comprises multiple wedge shaped symbols.

11. The method of claim 1, wherein one or more of the symbols comprises binary data, analog values, or combinations thereof.

12. The method of claim 1, wherein one or more of the patterns comprises black as the less reflective surface and white as the more reflective surface and the same length of white as black in a complete revolution around the circumference of the shaft.

13. The method of claim 1, wherein repeatability of the spacing but not spacing itself determines the resolution of the rotational position measurement.

14. The method of claim 1, wherein at least one symbol comprises a wedge in order to provide axial position measurement.

15. The method of claim 1, wherein one or more of the patterns comprises a combination of non-wedged and wedged symbols in order to fit more symbols around the circumference of the shaft for the same minimum feature size.

16. The method of claim 11, wherein one or more analog values are encoded in the symbol, allowing redundant measurement of shaft position.

* * * * *